United States Patent
Weyrauch et al.

(10) Patent No.: US 11,453,345 B2
(45) Date of Patent: Sep. 27, 2022

(54) VEHICLE MULTI-PURPOSE BRACKETS

(71) Applicant: FORD GLOBAL TECHNOLOGIES, LLC, Dearborn, MI (US)

(72) Inventors: Adam Weyrauch, Canton, MI (US); Joseph Prescott Hickey, Westland, MI (US); Michael Kozak, Canton, MI (US); Jeffry Smith, Commerce Township, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 222 days.

(21) Appl. No.: 16/438,789

(22) Filed: Jun. 12, 2019

(65) Prior Publication Data

US 2020/0391666 A1    Dec. 17, 2020

(51) Int. Cl.
| | |
|---|---|
| *B60R 11/00* | (2006.01) |
| *B60R 21/06* | (2006.01) |
| *B23P 13/02* | (2006.01) |
| *B60R 21/02* | (2006.01) |

(52) U.S. Cl.
CPC .............. *B60R 11/00* (2013.01); *B23P 13/02* (2013.01); *B60R 21/026* (2013.01); *B60R 21/06* (2013.01); *B23P 2700/50* (2013.01); *B60R 2011/0003* (2013.01); *B60R 2011/0052* (2013.01)

(58) Field of Classification Search
CPC ........ B60R 11/00; B60R 21/026; B60R 21/06
USPC ....................... 224/311; 248/221.12, 222.41; 296/24.43, 24.42, 37.16; 280/749; 410/18, 97, 100, 117, 118
See application file for complete search history.

(56) References Cited

U.S. PATENT DOCUMENTS

| | | | | |
|---|---|---|---|---|
| 2,766,000 A | * | 10/1956 | Pisciotta | ................ A47H 1/142 248/300 |
| 3,140,071 A | * | 7/1964 | Lorentzen | ................ A47H 1/14 248/273 |
| 5,121,958 A | * | 6/1992 | Goeden | ................... B60R 7/005 296/24.43 |
| 5,551,726 A | * | 9/1996 | Ament | .................... B60R 21/06 280/749 |
| 5,685,470 A | * | 11/1997 | Moore | .................... B60R 7/005 224/567 |
| 5,772,370 A | * | 6/1998 | Moore | .................... B60R 7/005 296/37.16 |
| 6,109,819 A | * | 8/2000 | Welch | .................. A47B 13/003 248/222.41 |

(Continued)

FOREIGN PATENT DOCUMENTS

| | | |
|---|---|---|
| CN | 208359893 U | 1/2019 |
| EP | 1258390 A1 | 11/2002 |

(Continued)

OTHER PUBLICATIONS

Honda CRV Luggage Partition Divider; TDG 1544D Fitting Instruction, trav all; TDG-14816-FI; three pages.

*Primary Examiner* — Nathan J Newhouse
*Assistant Examiner* — Lester L Vanterpool
(74) *Attorney, Agent, or Firm* — Vichit Chea; Carlson, Gaskey & Olds, P.C.

(57) ABSTRACT

This disclosure details multi-purpose brackets for mounting accessory devices within vehicle cargo spaces. Exemplary multi-purpose brackets include a doubling flange, a first opening formed through the doubling flange, and a second opening formed through another location of the bracket. A first accessory device may be mounted within the first opening, and a second accessory device may be mounted within the second opening. The multi-purpose bracket may be formed in a stamping process that involves folding and clinching the doubling flange to a platform of the bracket.

17 Claims, 4 Drawing Sheets

(56) References Cited

U.S. PATENT DOCUMENTS

| | | | | |
|---|---|---|---|---|
| 6,302,463 | B1 * | 10/2001 | Moore | B60R 7/005 |
| | | | | 296/24.43 |
| 6,817,644 | B2 * | 11/2004 | Moore | B60R 7/005 |
| | | | | 296/24.43 |
| 6,851,702 | B2 * | 2/2005 | Henderson | B60R 21/213 |
| | | | | 280/730.2 |
| 6,983,970 | B2 * | 1/2006 | Bateman | B60R 21/06 |
| | | | | 296/24.43 |
| 7,207,613 | B2 * | 4/2007 | Walter | B60R 21/06 |
| | | | | 280/748 |
| 7,300,085 | B2 * | 11/2007 | Giumelli | B60R 21/026 |
| | | | | 160/DIG. 2 |
| 7,597,342 | B2 * | 10/2009 | Cheal | B60R 21/217 |
| | | | | 280/728.2 |
| 8,646,807 | B2 * | 2/2014 | Suga | B60R 21/06 |
| | | | | 280/730.2 |
| 8,857,849 | B2 * | 10/2014 | Malmenstam | B60R 21/20 |
| | | | | 280/728.2 |
| 2007/0018442 | A1 * | 1/2007 | Kwok | B60R 21/08 |
| | | | | 280/749 |
| 2007/0057499 | A1 * | 3/2007 | Fengel | B60R 21/06 |
| | | | | 280/749 |
| 2009/0045652 | A1 | 2/2009 | Mossberg et al. | |

FOREIGN PATENT DOCUMENTS

| | | |
|---|---|---|
| FR | 2982816 A1 | 5/2013 |
| KR | 101937683 B1 | 1/2019 |

* cited by examiner

VEHICLE MULTI-PURPOSE BRACKETS

TECHNICAL FIELD

This disclosure relates generally to multi-purpose brackets for mounting accessory devices within vehicle cargo spaces.

BACKGROUND

Many automotive vehicles include cargo spaces for storing and hauling cargo. Numerous accessory devices (e.g., grab handles, luggage dividers, etc.) are commonly employed for facilitating use of the cargo spaces. Typically, separate brackets are required for mounting each of the accessory devices within the vehicle cargo space.

SUMMARY

A multi-purpose bracket for a vehicle according to an exemplary aspect of the present disclosure includes, among other things, a platform, a first opening formed through the platform, and a doubling flange received against the platform. The first opening extends through both the platform and the doubling flange.

In a further non-limiting embodiment of the foregoing multi-purpose bracket, a second opening is formed through the platform. The second opening is shaped differently from the first opening.

In a further non-limiting embodiment of either of the foregoing multi-purpose brackets, the first opening is keyhole shaped.

In a further non-limiting embodiment of any of the foregoing multi-purpose brackets, the doubling flange is integrally connected to the platform by a bent edge.

In a further non-limiting embodiment of any of the foregoing multi-purpose brackets, the platform includes a first platform section that includes the first opening and a second platform section that includes a second opening.

In a further non-limiting embodiment of any of the foregoing multi-purpose brackets, the first platform section is connected to the second platform section by a curved transition section.

In a further non-limiting embodiment of any of the foregoing multi-purpose brackets, a first leg extends from a first end of the platform, a second leg extends from a second end of the platform, and a third leg extends from a first side of the platform.

In a further non-limiting embodiment of any of the foregoing multi-purpose brackets, the platform and the doubling flange are joined together by at least one clinch.

In a further non-limiting embodiment of any of the foregoing multi-purpose brackets, the doubling flange and the platform form a monolithic structure.

In a further non-limiting embodiment of any of the foregoing multi-purpose brackets, the doubling flange is bent into contact with an undersurface of the platform.

A vehicle according to another exemplary aspect of the present disclosure includes, among other things, a vehicle body, a first bracket mounted to the vehicle body and including a doubling flange, a first opening formed through the doubling flange, and a second opening located remotely from the doubling flange. A second bracket is mounted to the vehicle body at a location that is spaced apart from the first bracket. A first accessory device is mounted within the first opening and a second accessory device is mounted within the second opening and bridges a distance between the first bracket and the second bracket.

In a further non-limiting embodiment of the foregoing vehicle, the vehicle body includes a roof rail, and the first bracket is mounted to the roof rail.

In a further non-limiting embodiment of either of the foregoing vehicles, the first accessory device is a luggage divider and the second accessory device is a grab handle.

In a further non-limiting embodiment of any of the foregoing vehicles, the first opening extends through both a platform of the first bracket and the doubling flange.

In a further non-limiting embodiment of any of the foregoing vehicles, a rod of the first accessory device is received within the first opening.

In a further non-limiting embodiment of any of the foregoing vehicles, a mushroom head of the rod bears against the doubling flange.

In a further non-limiting embodiment of any of the foregoing vehicles, the first opening is keyhole shaped and the second opening is shaped different than the first opening.

In a further non-limiting embodiment of any of the foregoing vehicles, the doubling flange is bent into contact with an undersurface of a platform of the first bracket and is connected to the platform at a bent edge.

In a further non-limiting embodiment of any of the foregoing vehicles, the platform and the doubling flange are joined together by at least one clinch.

A method according to another exemplary aspect of the present disclosure includes, among other things, folding a doubling flange against an undersurface of a platform of a bracket, joining the doubling flange and the platform together, and piercing a first opening through both the doubling flange and the platform.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details multi-purpose brackets for mounting accessory devices within vehicle cargo spaces. Exemplary multi-purpose brackets include a doubling flange, a first opening formed through the doubling flange, and a second opening formed through another location of the bracket. A first accessory device may be mounted within the first opening, and a second accessory device may be mounted within the second opening. The multi-purpose bracket may be formed in a stamping process that involves folding and clinching the doubling flange to a platform of the bracket. These and other features of this disclosure are described in greater detail below.

Figure 1:
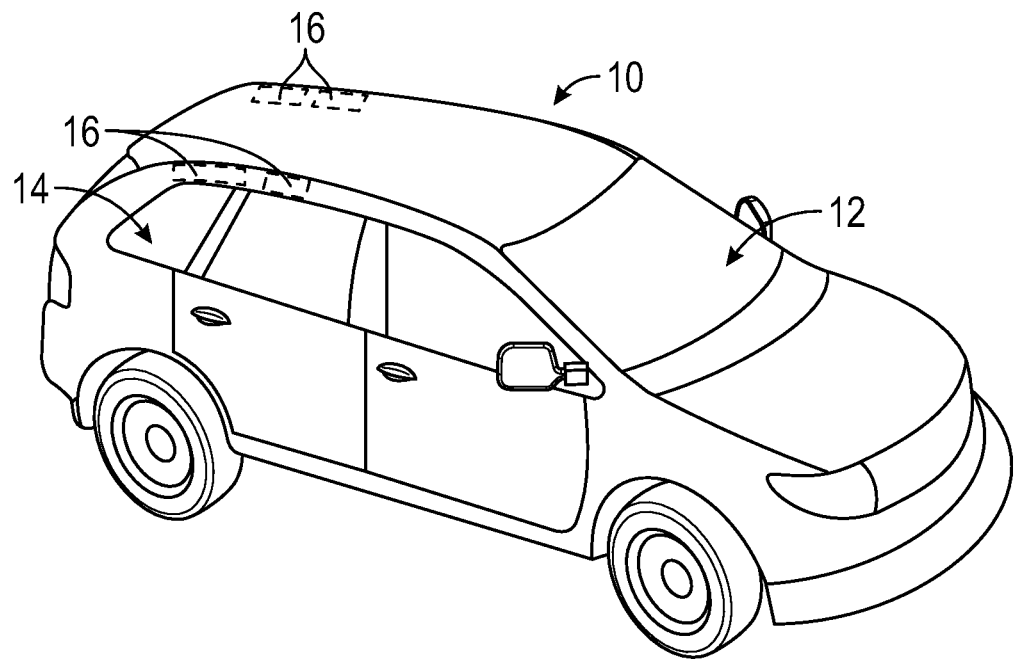
FIG. 1 schematically illustrates a vehicle equipped with a cargo space for storing and hauling cargo.

FIG. 1 schematically illustrates a vehicle 10. The vehicle 10 may be a car, a truck, a van, a sport utility vehicle (SUV), or any other type of vehicle. The vehicle 10 could also be a conventional motor vehicle, a battery powered hybrid or electric vehicle, or an autonomous vehicle (i.e., a driverless vehicle).

Although a specific component relationship is illustrated in the figures of this disclosure, the illustrations are not intended to limit this disclosure. The placement and orientation of the various components of the vehicle 10 are shown schematically and could vary within the scope of this disclosure. In addition, the various figures accompanying this disclosure are not necessarily drawn to scale, and some features may be exaggerated or minimized to emphasize certain details of a particular component.

The vehicle 10 includes a passenger cabin 12 and a cargo space 14. In general, the passenger cabin 12 is primarily configured for seating one or more rows of passengers of the vehicle 10, and the cargo space 14 is primarily configured for storing and hauling various forms of cargo within the vehicle 10. In an embodiment, the cargo space 14 is located rearward of the passenger cabin 12.

A plurality of brackets 16 may be used for mounting various accessory devices (not shown in FIG. 1) within either a rear row of the passenger cabin 12 or the cargo space 14. The accessory devices facilitate improved usage of the cargo space 14. Non-limiting examples of accessory devices that may be mounted within the vehicle 10 using the brackets 16 include grab handles, luggage dividers (i.e., dog guards), coat hooks, cargo bin holders, clothing bars, sun shades, cargo nets, etc.

In the past, separate brackets 16 have typically been required for mounting each of the accessory devices within the vehicle 10. Multi-purpose brackets that combine the functionality of at least a portion of the brackets 16 are therefore proposed within this disclosure.

Figure 2:
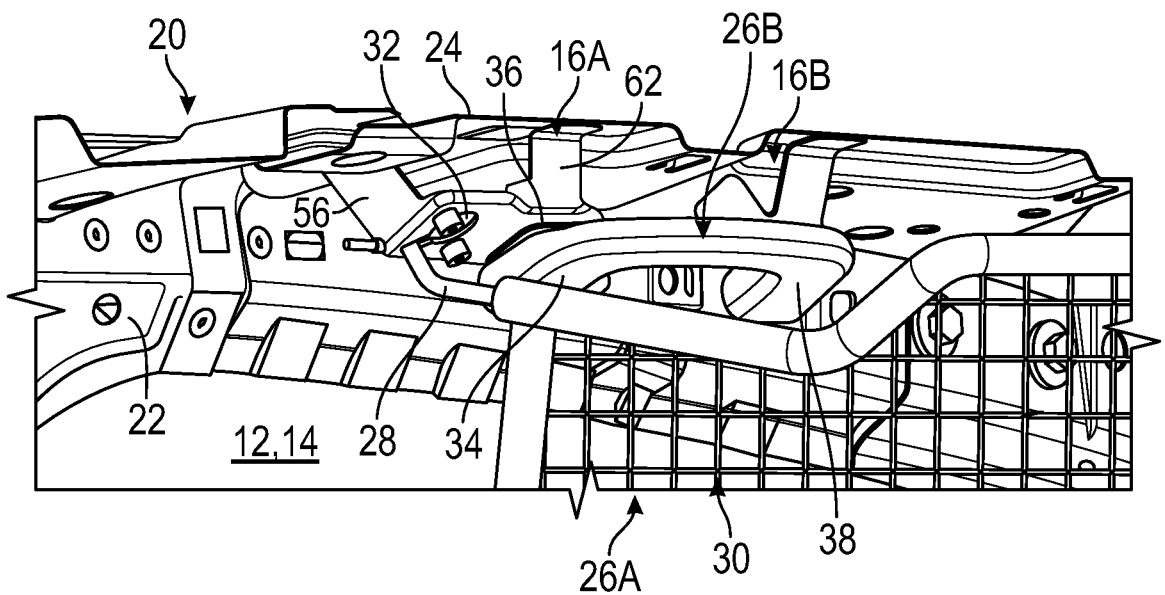
FIG. 2 illustrates select portions of a vehicle cargo space. Brackets are employable within the cargo space for mounting accessory devices.

FIG. 2 illustrates select portions of a cargo space 14 of a vehicle, such as the vehicle 10 of FIG. 1 or any other vehicle. The cargo space 14 is established by a vehicle body 20. The vehicle body 20 may include a plurality of vehicle body components that connect together to form the vehicle body 20. The vehicle body components may include, among other components, frame rails 22 and a roof rail 24 that may be secured to one or more of the frame rails 22.

A first bracket 16A and a second bracket 16B may be fixedly mounted to the frame rail 22, the roof rail 24, both the frame rail 22 and the roof rail 24, or to any other vehicle body component of the vehicle body 20. The first and second brackets 16A, 16B could be mounted within a second row of the passenger cabin 12 or within the cargo space 14. In an embodiment, the first bracket 16A and the second bracket 16B are spot welded to the vehicle body 20. However, other attachment methodologies, including mechanical fasteners such as screws or bolts, may be utilized to mount the first bracket 16A and the second bracket 16B to the vehicle body 20.

The first bracket 16A and the second bracket 16B may be employed for mountably supporting a first accessory device 26A and a second accessory device 26B within the cargo space 14. In an embodiment, the first accessory device 26A is a luggage divider and the second accessory device 26B is a grab handle. However, other accessory devices are also contemplated within the scope of this disclosure. In addition, greater than two accessory devices could optionally be mounted within the cargo space 14, such as by using additional brackets.

In an embodiment, the first bracket 16A provides attachment points for mountably supporting both the first accessory device 26A and the second accessory device 26B and is therefore considered a multi-purpose bracket, whereas the second bracket 16B provides a single attachment point for mounting only the second accessory device 26B and is therefore considered a single-purpose bracket. Although not shown in FIG. 2, a similar first and second bracket configuration could be employed on an opposite side of the cargo space 14 for supporting the opposite side of the first accessory device 26A and an additional accessory device (e.g., an additional grab handle).

The first accessory device 26A may include one or more rods 28 and a cage or netting 30 that is supported by the rod(s) 28. The rod 28 of the first accessory device 26A may be mounted within a first opening 32 of the first bracket 16A, and a first mounting section 34 of the second accessory device 26B may be mounted within a second opening 36 of the first bracket 16A. A second mounting section 38 of the second accessory device 26B may be mounted to the second bracket 16B, such as within an opening (not shown in FIG. 2) of the second bracket 16B. When mounted, the second accessory device 26B may therefore bridge a distance between the first bracket 16A and the second bracket 16B.

Figure 3:
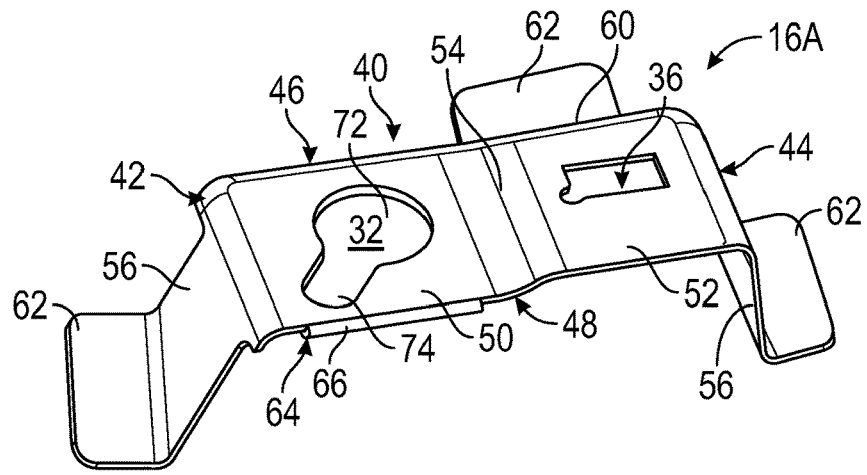
FIG. 3 is a top perspective view of an exemplary multi-purpose bracket.
Figure 4:
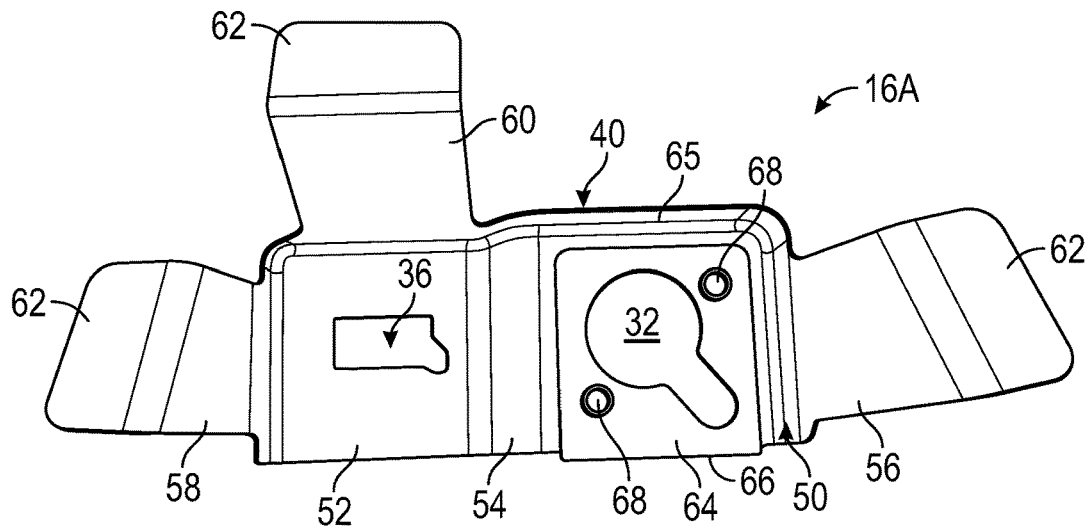
FIG. 4 is a bottom perspective view of the multi-purpose bracket of FIG. 3.
Figure 5:
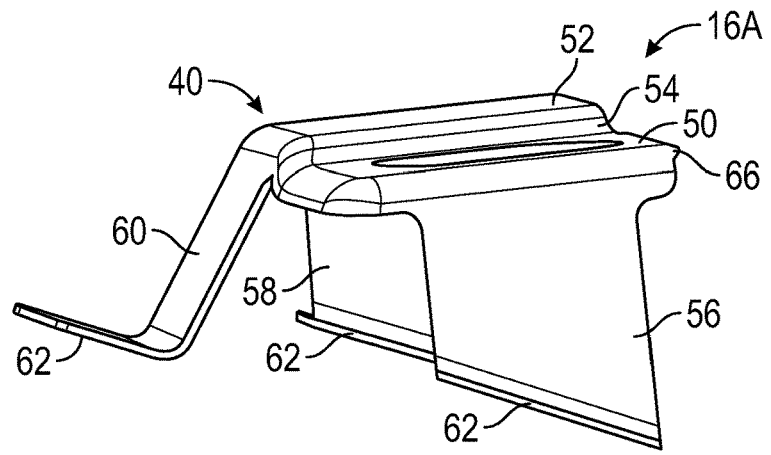
FIG. 5 is an end view of the multi-purpose bracket of FIG. 3.

FIGS. 3, 4, and 5, with continued reference to FIG. 2, illustrate the first bracket 16A (i.e., the multi-purpose bracket) according to an exemplary embodiment of this disclosure. The first bracket 16A may include a platform 40 that extends between a first end 42 and a second end 44 and between a first side 46 and a second side 48. In an embodiment, the platform 40 is rectangular shaped. However, the size and shape of the platform 40 are not intended to limit this disclosure.

The platform 40 may include a first platform section 50, a second platform section 52, and a transition section 54 that connects the first and second platform sections 50, 52. The transition section 54 may be curved. In an embodiment, the first and second platform sections 50, 52 extend in different planes relative to one another (i.e., one of the platform sections is elevated relative to the other platform section when the first bracket 16A is viewed from the top).

A first opening 32 may be formed completely through the first platform section 50, and a second opening 36 may be formed completely through the second platform section 52. As stated above, the first opening 32 and the second opening 36 establish attachment points for mounting two different accessory devices to the first bracket 16A. In an embodiment, the first opening 32 is keyhole shaped, and the second opening 32 is shaped differently from the first opening 32.

The first bracket 16A may additionally include a first leg 56, a second leg 58, and a third leg 60 that each facilitate mounting the first bracket 16A to one or more vehicle body components of the vehicle body 20 (see, e.g., FIG. 2). In an embodiment, the first leg 56 extends from the first end 42 of the platform 40, the second leg 58 extends from the second end 44 of the platform 40, and the third leg 60 extends from the first side 46 of the platform 40. When the first bracket 16A is mounted within the cargo space 14, the first side 46 is an inboard side of the first bracket 16A (see FIG. 2). Therefore, the third leg 60 faces in an inboard direction toward the volume of the cargo space 14 when the first bracket 16A is mounted to the vehicle body 20.

The first leg 56, the second leg 58, and the third leg 60 may each include a mounting platform 62. The mounting platforms 62 may extend transversely from a section of the legs 56, 58, 60 that connects to the platform 40. The mounting platforms 62 establish flat surfaces for mounting the first bracket 16A to the vehicle body 20. In an embodiment, the mounting platforms 62 are welded to the vehicle body 20.

The first bracket 16A may additionally include a doubling flange 64 that reinforces the platform 40 in the vicinity of the first opening 32. The doubling flange 64 may be bent over and received against an undersurface 65 of the first platform section 50. In an embodiment, the doubling flange 64 is integrally connected to the first platform section 50 at a bent edge 66. The bent edge 66 may be formed at the second side 48 of the platform 40 and is therefore located on an opposite side from the third leg 60.

In an embodiment, the doubling flange 64 is held against the undersurface 65 of the first platform section 50 by one or more clinches 68. The clinches 68 may be formed in both the doubling flange 64 and the first platform section 50 of the platform 40 via a stamping or press-joining process. The clinches 68 effectively interlock the first platform section 50 and the doubling flange 64 together, thereby increasing the mechanical strength of the first bracket 16A in the vicinity of the first opening 32.

Figure 6:
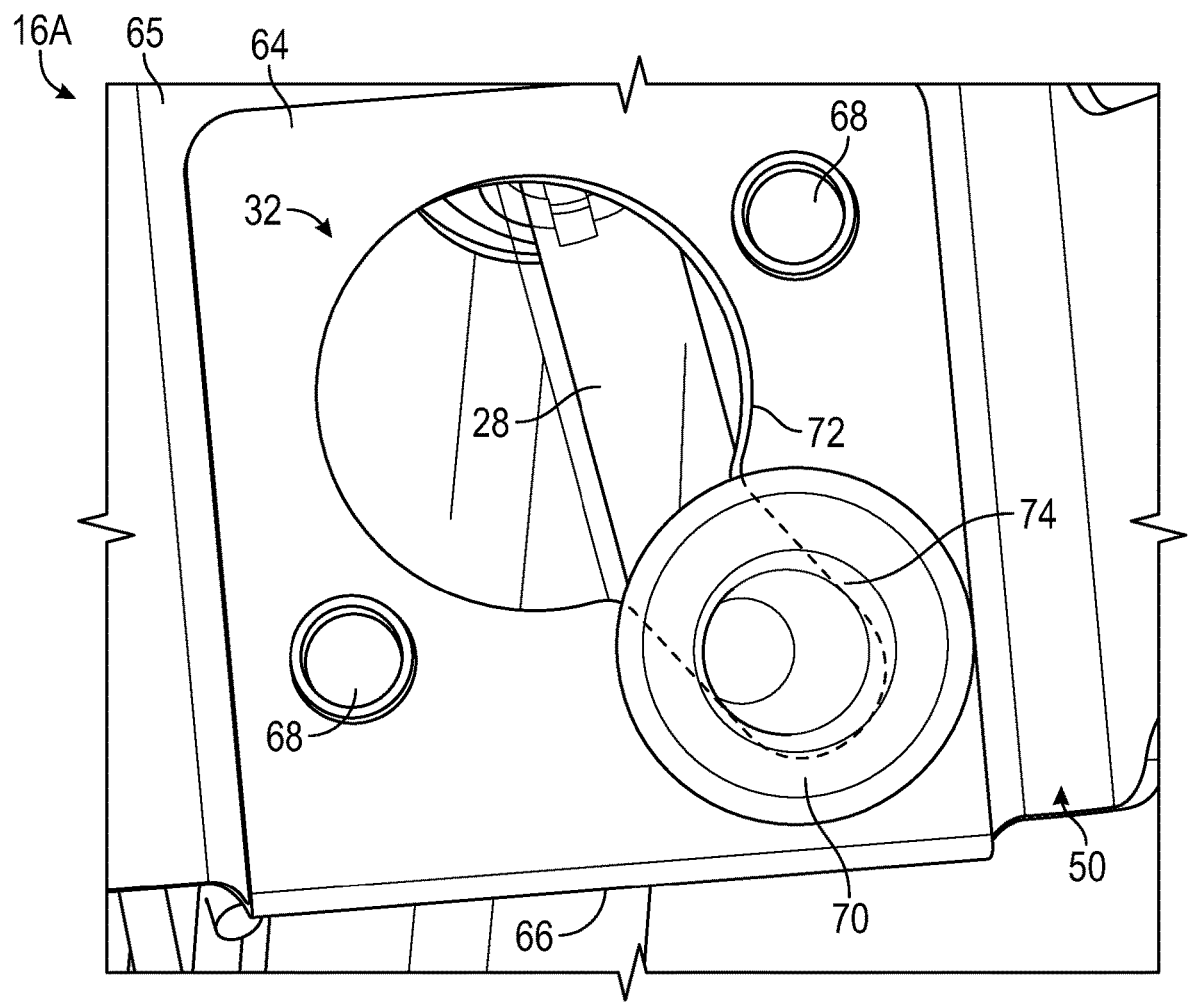
FIG. 6 is a blown-up view of a doubling flange of the multi-purpose bracket of FIGS. 3-5.

The first opening 32 may extend through both the first platform section 50 of the platform 40 and the doubling flange 64. The first opening 32 may accommodate the rod 28 of the first accessory device 26A such that a mushroom head 70 of the rod 28 bears against the doubling flange 64 (see FIG. 6). The doubling flange 64 is configured to help prevent the rod 28 from pulling through the first opening 32. The mushroom head 70 may be positioned within a first portion 72 of the first opening 32 and may then be slid into a narrower portion 74 of the first opening 32 to secure the rod 28 to the first bracket 16A.

The first bracket 16A may be made from a metallic material (e.g., steel, aluminum, etc.). The exact material make-up of the first bracket 16A is not intended to limit this disclosure.

In an embodiment, the first bracket 16A is a single-piece monolithic structure that is formed from a single piece of material. The doubling flange 64 is part of the single-piece monolithic structure rather than being a separate piece that is separately attached to the first bracket 16A. The first bracket 16A may be formed in a stamping process, as is further discussed below.

Figure 7:
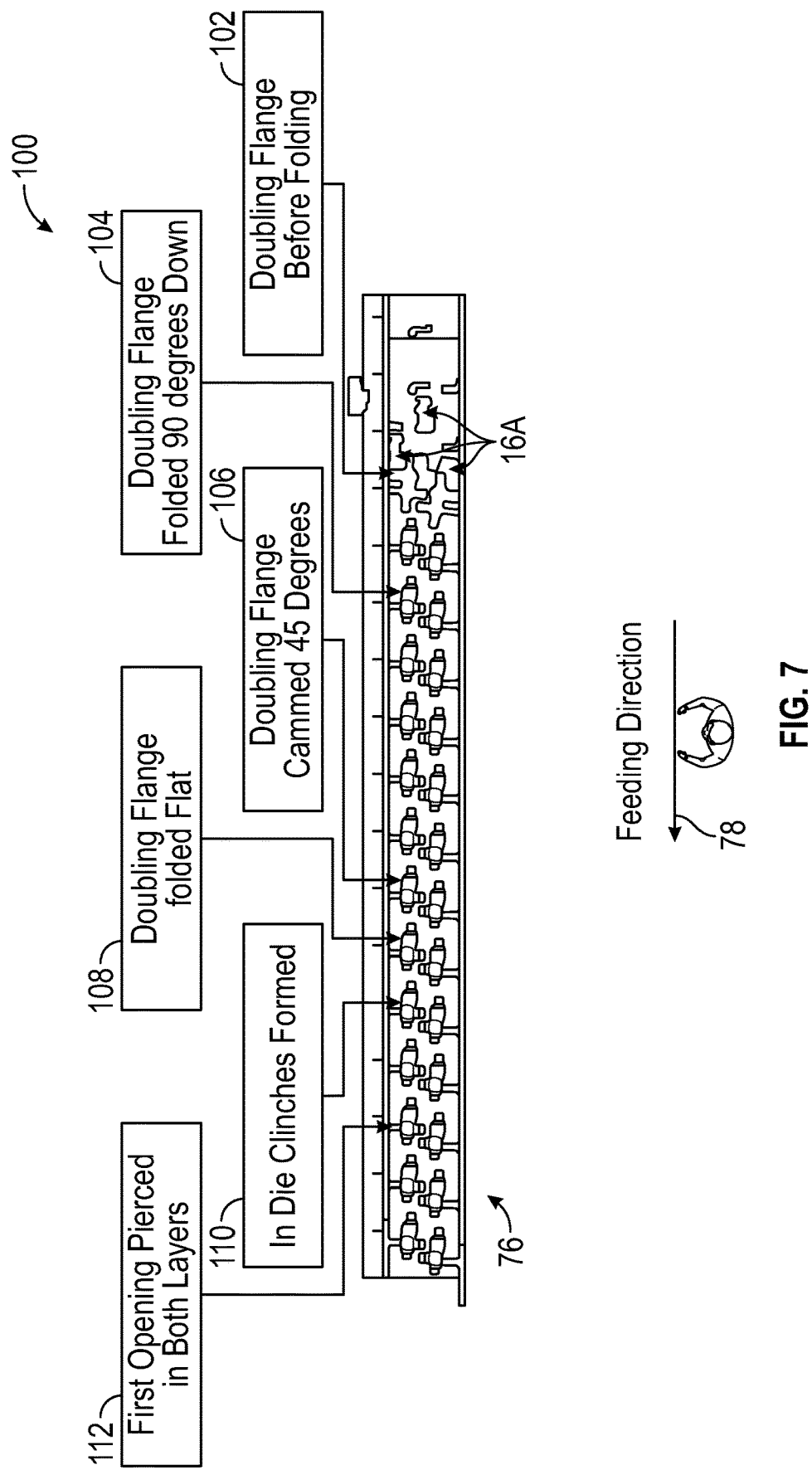
FIG. 7 schematically illustrates a stamping process for forming a multi-purpose bracket for use within vehicle cargo spaces.

FIG. 7, with continued reference to FIGS. 1-6, schematically illustrates a stamping process 100 for manufacturing the first bracket 16A. Fewer or additional steps than are recited below could be performed as part of the stamping process 100 within the scope of this disclosure. In addition, the recited order of steps shown in FIG. 7 is not intended to limit this disclosure. The stamping process 100 may involve the use of a metallic coil strip 76 that is fed in a feeding direction 78 through a plurality of stations of a progressive stamping die.

By the time the stamping process 100 arrives at bock 102, the basic shape of a plurality of the first brackets 16A has already been formed. However, the doubling flange 64 has not yet been folded on each of the first brackets 16A at block 102.

At block 104 of the stamping process 100, the doubling flange 64 may be folded approximately 90 degrees relative to the platform 40 of the first bracket 16A. Folding the doubling flange 64 begins the formation of the bent edge 66. The doubling flange 64 may be cammed an additional 45 degrees at block 106 of the stamping process 100. The doubling flange 64 may then be folded flat against the undersurface 65 of the first platform portion 50 of the platform 40 at block 108. Next, at block 110, the clinches 68 may be formed in the doubling flange 64 and the first platform portion 50 for interlocking these sheets together. Blocks 104-110 may be referred to as a hemming procedure of the stamping process 100. The hemming procedure produces the doubling flange 64 "in-die" and therefore avoids the need for attachment of a separate reinforcement plate after completing the stamping process 100.

Finally, at block 112, the first opening 32 may be pierced through both the first platform portion 50 and the doubling flange 64 of the first bracket 16A. Although not shown in this embodiment, additional stamping operations could operationally be performed in order to complete the formation of each of the first brackets 16A. Once manufactured, the first bracket 16A may be mounted for use within the cargo space 14.

The multi-purpose brackets described herein combine multiple functions into a single bracket design by providing mounting attachment points for mountably receiving more than one accessory devices. Therefore, separate brackets are not required for each accessory device of the vehicle. The exemplary multi-purpose brackets further incorporate a doubling flange that is formed "in-die," thereby leading to manufacturing efficiencies and cost savings by avoiding the need for additional reinforcing parts.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A multi-purpose bracket for a vehicle, comprising:
    a platform extending between a first end and a second end and between a first side and a second side;
    a first opening formed through the platform;
    a doubling flange received against the platform;
    a clinch holding the doubling flange against an undersurface of the platform,
    wherein the first opening extends through both the platform and the doubling flange;
    a first mounting leg that extends from the first side; and
    a bent edge positioned at the second side, wherein the bent edge integrally connects the doubling flange to the platform.

2. The multi-purpose bracket as recited in claim 1, comprising a second opening formed through the platform, wherein the second opening is shaped differently from the first opening.

3. The multi-purpose bracket as recited in claim 1, wherein the first opening is keyhole shaped.

4. The multi-purpose bracket as recited in claim 1, wherein the platform includes a first platform section that includes the first opening and a second platform section that includes a second opening.

5. The multi-purpose bracket as recited in claim 4, wherein the first platform section is connected to the second platform section by a curved transition section such that first platform section or the second platform section is elevated relative to other of the first platform section or the second platform section.

6. The multi-purpose bracket as recited in claim 1, comprising a second mounting leg that extends from the first end of the platform and a third mounting leg that extends from the second end of the platform.

7. The multi-purpose bracket as recited in claim 1, wherein the doubling flange and the platform form a monolithic structure.

8. The multi-purpose bracket as recited in claim 1, wherein the doubling flange is bent into contact with the undersurface of the platform, and further wherein the clinch is formed in both the doubling flange and the platform.

9. A vehicle, comprising:
a vehicle body;
a first bracket mounted to the vehicle body and including a doubling flange, a first opening formed through the doubling flange, and a second opening located remotely from the doubling flange;
a second bracket mounted to the vehicle body at a location that is spaced apart from the first bracket;
a first accessory device mounted within the first opening; and
a second accessory device mounted within the second opening and bridging a distance between the first bracket and the second bracket,
wherein the first accessory device is a luggage divider and the second accessory device is a grab handle,
wherein a first mounting section of the grab handle is received within the second opening of the first bracket and a second mounting section of the grab handle is received within an opening of the second bracket.

10. The vehicle as recited in claim 9, wherein the vehicle body includes a roof rail, and the first bracket is mounted to the roof rail.

11. The vehicle as recited in claim 9, wherein the first opening extends through both a platform of the first bracket and the doubling flange.

12. The vehicle as recited in claim 9, wherein a rod of the first accessory device is received within the first opening.

13. The vehicle as recited in claim 12, wherein a mushroom head of the rod bears against the doubling flange.

14. The vehicle as recited in claim 9, wherein the first opening is keyhole shaped and the second opening is shaped different than the first opening.

15. The vehicle as recited in claim 9, wherein the doubling flange is bent into contact with an undersurface of a platform of the first bracket and is connected to the platform at a bent edge.

16. The vehicle as recited in claim 15, wherein the platform and the doubling flange are joined together by at least one clinch.

17. The vehicle as recited in claim 9, wherein the first bracket is a multi-purpose bracket and the second bracket is a single-purpose bracket.

* * * * *